United States Patent
Biskeborn

(10) Patent No.: US 7,570,457 B2
(45) Date of Patent: Aug. 4, 2009

(54) TAPE RECORDING HEAD WITH TRENCH DEFINING WEAR ZONE FOR CONSTANT RATE OF HEAD WEAR

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/095,194

(22) Filed: Mar. 31, 2005

(65) Prior Publication Data

US 2006/0221496 A1 Oct. 5, 2006

(51) Int. Cl.
G11B 5/187 (2006.01)
G11B 5/255 (2006.01)
G11B 15/60 (2006.01)

(52) U.S. Cl. .................. 360/122; 360/129; 360/130.21
(58) Field of Classification Search ............ 360/130.21, 360/121, 122, 129
See application file for complete search history.

(56) References Cited

U.S. PATENT DOCUMENTS

| | | | |
|---|---|---|---|
| 4,853,814 A | 8/1989 | McClure | 360/122 |
| 5,345,353 A | 9/1994 | Krantz et al. | 360/103 |
| 5,623,383 A | 4/1997 | Gregory et al. | 360/103 |
| 5,710,683 A | 1/1998 | Sundaram | 360/126 |
| 5,905,613 A * | 5/1999 | Biskeborn et al. | 360/130.21 |
| 6,122,147 A * | 9/2000 | Fahimi et al. | 360/130.21 |
| 6,690,542 B1 * | 2/2004 | Wang | 360/129 |
| 2003/0090833 A1 | 5/2003 | Tani et al. | 360/110 |

* cited by examiner

Primary Examiner—Craig A Renner
(74) Attorney, Agent, or Firm—William D. Gill; Jeffrey P. Aiello

(57) ABSTRACT

A magnetic recording head is provided comprising a flat contour head having a deposited closure. An ion-milled trench or recess is provided near the substrate edge to create a lip or wear zone between the trench edge and the substrate/gap interface. As the tape passes over the head, the lip begins to wear and acquires a bevel. After up to a few hundred hours of runtime, the bevel spans the entire length of the lip after which the bevel length remains constant resulting in a constant rate of head wear. The width of the lip or wear zone is chosen such that head wear chases gap and transducer wear resulting in reduced recession of the transducer from the recording tape.

9 Claims, 4 Drawing Sheets

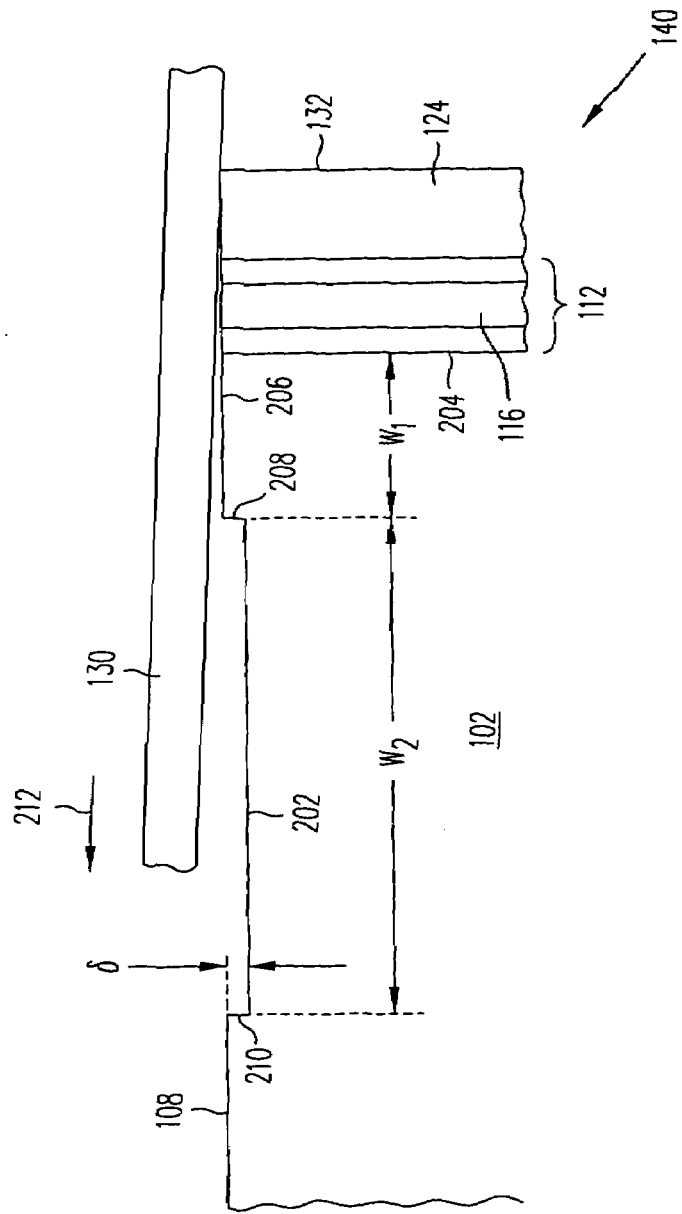
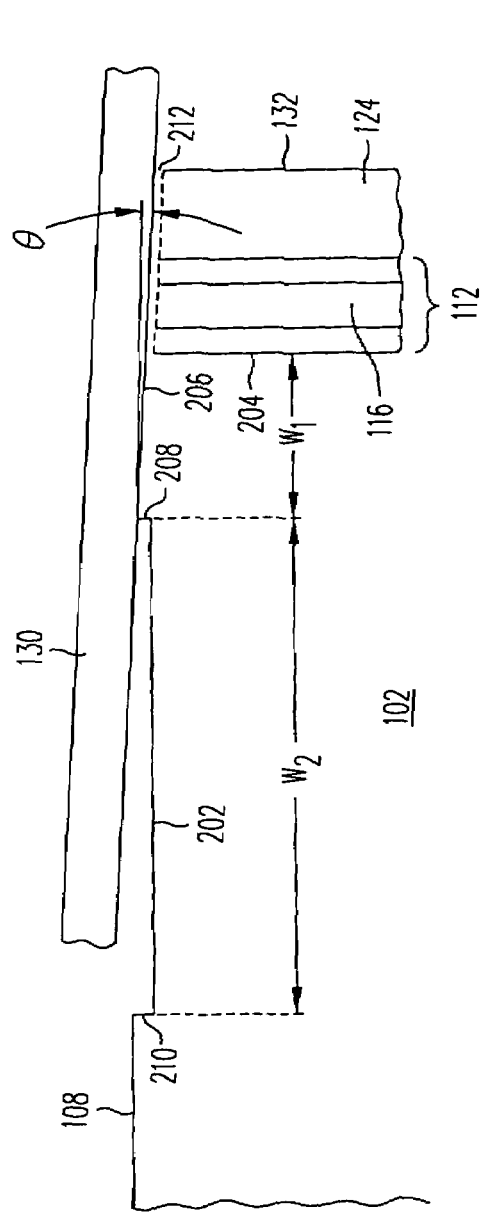

TAPE RECORDING HEAD WITH TRENCH DEFINING WEAR ZONE FOR CONSTANT RATE OF HEAD WEAR

BACKGROUND OF THE INVENTION

1. Field of the Invention

This invention relates to magnetic tape recording heads, and more particularly to a tape recording head having low transducer and gap recession due to tape wear.

2. Description of the Related Art

In magnetic storage systems, data is read from and written onto magnetic recording media utilizing magnetic transducers commonly referred to as magnetic heads. Data is written on the magnetic recording media by moving a magnetic recording head to a position over the media where the data is to be stored. The magnetic recording head then generates a magnetic field, which encodes the data into the magnetic media. Data is read from the media by similarly positioning the magnetic read head and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in intimate or near contact with the tape to effect efficient signal transfer, and so that the read element is in intimate or near contact with the tape to provide effective coupling of the magnetic field from the tape to the read element.

A flat contour thin film tape recording head for a bi-directional tape drive is described in commonly assigned U.S. Pat. No. 5,905,613 to Biskeborn and Eaton which is incorporated by reference herein. The flat contour head comprises a flat transducing surface on a substrate having a row of thin film transducers formed on a surface on one side of the substrate which forms a gap. The substrate with the row of transducers is called a "rowbar substrate". The transducers are protected by a closure of the same or similar ceramic as the substrate. For a read-while-write bi-directional head which requires that the read transducer follows behind the write transducer, two rowbar substrates with closures are mounted in a carrier facing one another. The recording tape overwraps the corners of both substrates and closures with an angle sufficient to scrape (skive) the air from the surface of the tape and not so large as to allow air to reenter between the tape and the transducing surface after the tape passes the corner. By scraping the air from the surface of the moving tape, a vacuum forms between the tape and the flat transducing surface holding the tape in contact with the transducing surface. At the corners of the air skiving edge, bending of the recording tape due to the overwrap results in separation of the tape from the transducing surface for a distance that depends on the wrap angle, the tape thickness and the tape tension. The transducers must be spaced from the corners of the air skiving edges at a sufficient distance to allow the vacuum between the tape and the transducing surface to overcome this separation.

Recession of the transducers in the gap between the hard ceramic substrate and closure due to tape wear is a problem that results in increased spacing loss of the readback signal. Efforts to minimize gap erosion in hard disk drive type ceramic tape heads usually involves making the gap materials more wear resistant or coating the head with wear resistant material. Transducer materials must have specific magnetic properties which greatly limits the search for materials having both good magnetic and mechanical properties. Coatings may eventually wear off and/or cause unacceptable spacing loss.

There is an ongoing need for a tape recording head having reduced recession of the transducers to improve reliability and component life. The present invention provides an improved recording head to address this need.

SUMMARY OF THE INVENTION

In accordance with the principles of the present invention, there is disclosed a tape recording head comprising a flat contour head having a deposited closure. An ion-milled trench or recess is provided near the substrate edge to create a lip or wear zone between the trench edge and the substrate/gap interface. As the tape passes over the head, the lip begins to wear and acquires a bevel. After up to a few hundred hours of runtime, the bevel spans the entire length of the lip after which the bevel length remains constant resulting in a constant rate of head wear. The width of the lip or wear zone is chosen such that head wear chases gap and transducer wear resulting in reduced recession of the transducer from the recording tape.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 2a is an end view illustration, not to scale, of the substrate edge and gap region of an embodiment of a low recession tape recording head of this invention prior to initiation of wear.

FIG. 2b is an end view illustration, not to scale, of the substrate edge and gap region of an embodiment of a low recession tape recording head of this invention after initial wear-in process.

DETAILED DESCRIPTION OF THE PREFERRED EMBODIMENT

Figure 1:
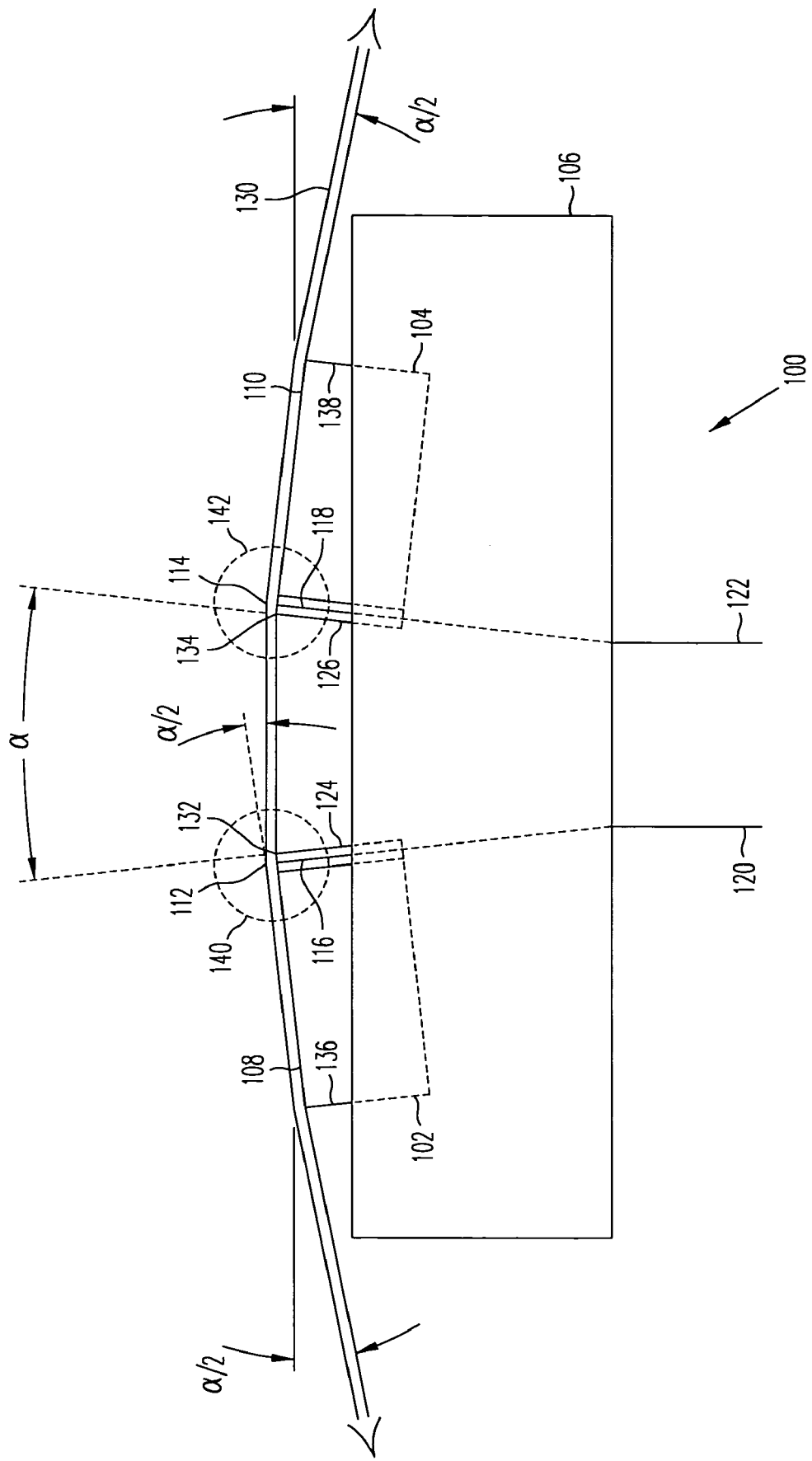
FIG. 1 is an end view illustration, not to scale, of a read-while-write bi-directional flat contour linear tape recording head.

FIG. 1 is an end view, not to scale, of an embodiment of a bi-directional read-while-write flat contour head 100 according to the present invention. Rowbar substrates 102 and 104 of a wear resistant material, such as the substrate ceramic typically used in magnetic disk drive heads, are fixed in a carrier 106 at a small angle α with respect to each other. The ceramic rowbar substrates 102 and 104 are provided with flat transducing surfaces 108 and 110. Rows of transducers 116 and 118 are provided at the surfaces of gaps 112 and 114. Electrical connection cables 120 and 122 connect the transducers to the read/write channel of the associated tape drive (not shown). The rows of transducers are protected by thin closures 124 and 126 made of a layer of hard, preferably conductive, material such as Al—Fe—Si (Sendust) deposited over the row of transducers, or alternatively of a layer of Al—O—Ti—C, Zr—O—Ti, Si—N, Si—C or Zr—O deposited or bonded to the row of transducers. Recording tape 130 wraps over the edges 132 and 134 of the closures 124 and 126 making a wrap angle α/2, usually between ⅛ and 3 degrees, relative to the transducing surfaces 108 and 110. The tape also wraps the outer edges 136 and 138 of the substrates, typically by an angle α/2.

FIG. 2a is an end view illustration, not to scale, of the substrate edge and gap region 140 of the low recession tape recording head 100 of this invention prior to initiation of head wear by the recording tape 130. A trench, or recess, 202 is formed in the transducing surface 108 near the substrate edge 204 of the rowbar substrate 102, preferably by ion milling. A wear zone 206 having a width $w_1$ forms a lip that extends from the substrate edge 204 to a first edge 208 of the trench 202. The trench 202 has a width $w_2$ that extends away from the wear zone 206 in the direction of tape travel, indicated by arrow 212, to a second edge 210. The trench 202 is milled to a depth δ, preferably in the range of 0.1-0.2 microns, and most preferably to a depth of 0.15 microns.

Figure 3:
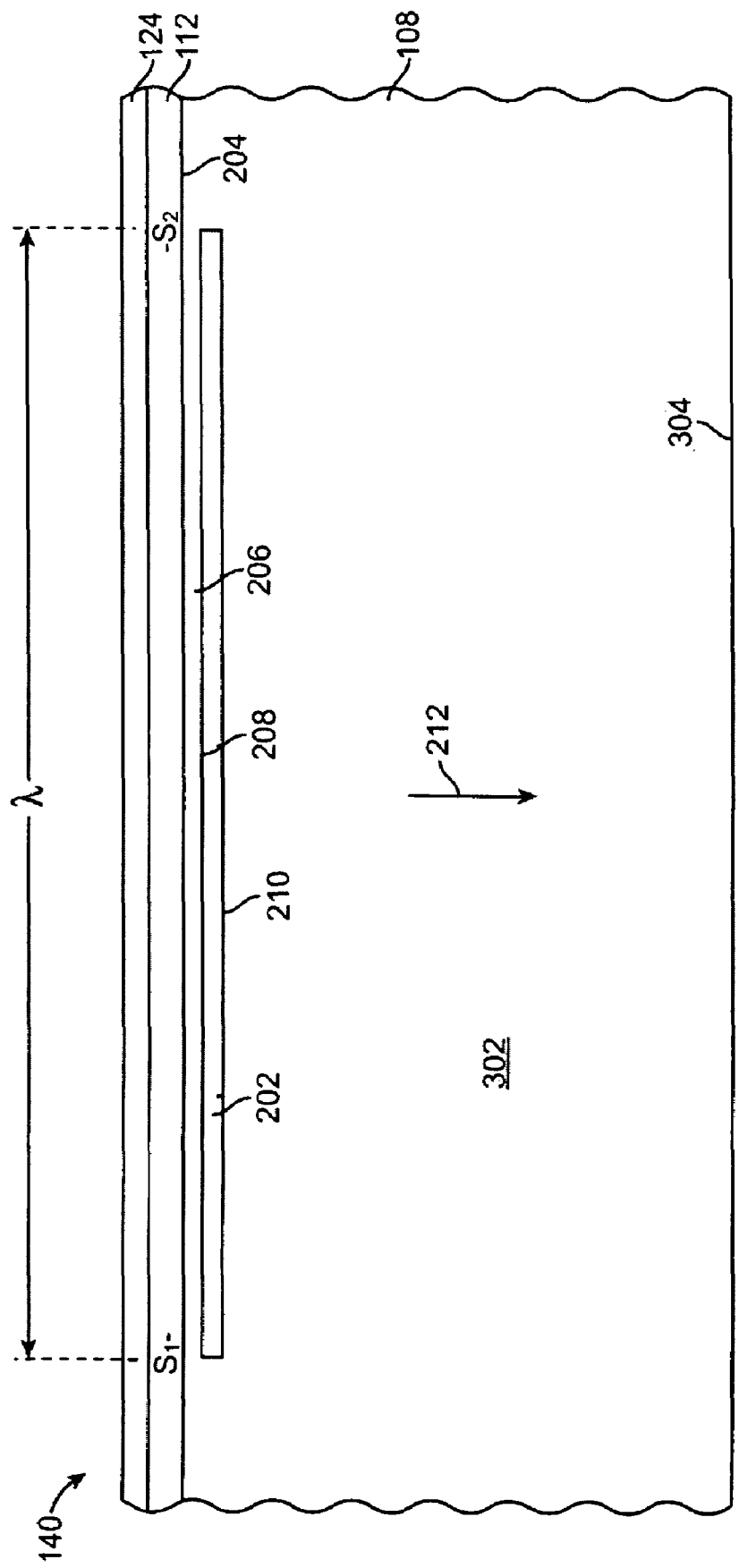
FIG. 3 is plan view, not to scale, of the transducer region of the transducing surface of the low recession tape recording head of FIG. 2.

FIG. 3 is plan view, not to scale, of the substrate edge and gap region 140 of the transducing surface of the low recession tape recording head depicted in FIG. 2a. The trench 202 extends a length λ corresponding to the span of the transducer row 116 in a direction perpendicular to the direction of tape travel indicated by arrow 212. The span of the transducer row is indicated in FIG. 3 as the region between first servo head $S_1$ and second servo head $S_2$. The tape bearing surface 302 of transducing surface 108 extends from substrate edge 204 to the edge 304 of transducing surface 108 furthest removed from the transducer row 116. The trench 202 should not extend beyond the region of the transducing surface 108 covered by the recording tape to prevent admission of air between the transducing surface 108 and the recording tape. Alternatively, the trench 202 may extend a length less than the full distance between servo heads $S_1$ and $S_2$ since the spacing between the servo transducers and the recording media on the tape is not as critical as for data heads. The trench 202 need not be continuous over its entire length, but may, alternatively, be compartmentalized shorter segments with gaps between segments (not shown).

FIG. 2b is an end view illustration, not to scale, of the substrate edge and gap region 140 after an initial wear-in period. During the wear-in period, the tape passing over the head wears the closure 124, the gap 112, and the wear zone 206 beveling at an angle θ, which is approximately ¼ to ⅓ of angle α/2, a region from the closure edge 132 to the first edge 208 of the trench 202 as depicted in FIG. 2b. The wear-in period typically requires up to a few hundred hours. After this wear-in period, the bevel length remains constant resulting in a constant rate of head wear which is a function of the width $w_1$ of the wear zone 206. The resultant constant head wear is tuned to chase the gap erosion resulting in significantly decreased recession 212 of the transducers 116 from the recording tape 130. Tuning or optimizing the head wear rate to chase the erosion of the softer materials in the gap is accomplished by choice of the width $w_1$ of the wear zone 206. For the preferred Al—O—Ti—C ceramic substrate material, a wear zone 206 having a width $w_1$ of about 30 microns was chosen. The width $w_2$ of the trench 202 was chosen to be about 70 microns so that the tape 130 tacks down on the transducing surface 108 beyond the trench.

The description hereinabove with respect FIGS. 2a, 2b and 3 depicts a trench 202 formed in the transducing surface 108 of the bi-directional read-while-write flat contour head 100. It will be understood that a similar trench is formed in the transducing surface 110 in the region 142 shown in FIG. 1 to provide reduced recession of the transducers 118 of the bi-directional head. Detailed description of the trench formed in the second transducing surface 110 is omitted in the interest of brevity.

The use of a trench in the transducing surface to modify the head wear rate so as to chase the gap erosion results in reduced transducer recession as described hereinabove. However, overall head wear will increase slightly due to the decreased contact area with the tape. The increased head wear is also advantageous in the head-tape contact regions as constant scrubbing and wear minimizes deposition and buildup of tape material and other contaminants on the head. This buildup is known to cause transducer-tape spacing losses. The increased head wear can be accommodated by windaging the stripe height of the transducer during fabrication.

Figure 4:
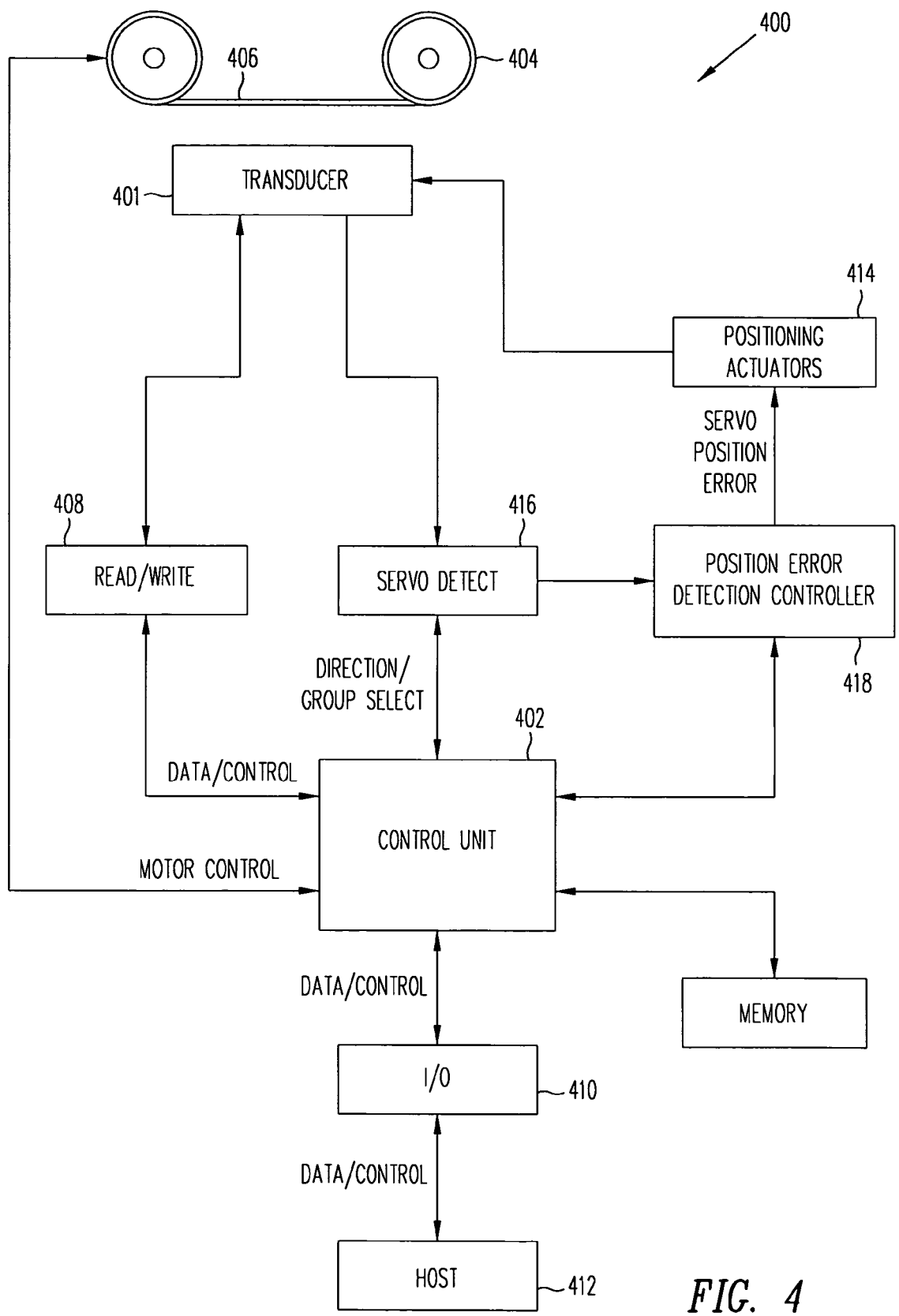
FIG. 4 is a simplified diagram of a magnetic tape recorder system using the magnetic recording head of the present invention.

FIG. 4 illustrates an embodiment of a magnetic tape recorder or tape drive system 400 incorporating the compression zone recording head of the present invention. A tape drive control unit 402 provides a motor control signal to rotate tape reels 404 and move magnetic tape 406 across the read/write transducer head 401. Read/write channel 408 transmits read/write signals between the read/write transducer 401 and the control unit 402. The data is communicated through I/O channel 410 with host 412. Lateral positioning of the transducer 401 with respect to the tape 406 is accomplished by positioning actuator 414. The lateral repositioning is required to access the various tracks of the tape 406 with the transducer 401. A servo system may be employed for accurate lateral repositioning of the transducer 401. An exemplary servo system includes a servo detector 416 to detect both the track that the head is currently on and whether the head is off center. Control unit 402 indicates the track address of a desired new track to position error detection controller 418 for repositioning the head. Servo detector 416 indicates the current track to position error detection controller 418, and the controller provides a servo position error signal to positioning actuator 414 which repositions the transducer 401 to the new track. The servo system also provides track following signals to positioning actuator 414 so that the tracks on tape 406 may be closely spaced.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

I claim:

1. A magnetic head, comprising:

a rowbar substrate having a transducing surface and a gap surface at a substrate edge;

a transducer row having at least one thin film transducer on the gap surface of the rowbar substrate, the transducer row forming a portion of the transducing surface;

a closure covering the transducer row on a side thereof opposite the gap surface of the rowbar substrate, the closure forming a portion of the transducing surface;

a trench formed in the transducing surface of the rowbar substrate, the trench having a first edge parallel to the substrate edge; and a wear zone defined on the transducing surface, the wear zone defined between the substrate edge and the first edge of the trench;

wherein, during a wear-in period, the closure, the gap, and the wear zone acquire a bevel that extends to the first edge of the trench, upon formation of the bevel, a length of the bevel remaining constant as a recording tape is passed over the head resulting in a constant rate of wear of the head, the resultant constant head wear tuned to chase erosion of the gap resulting in reduced recession of the transducer row from the recording tape passing over the head.

2. The magnetic head as recited in claim 1 wherein the trench has a length that extends the length of a span of the transducer row.

3. The magnetic head as recited in claim 1 wherein the trench has a depth in the range of 0.1-2.0 microns and the width of the trench is about 70 microns.

4. The magnetic head as recited in claim 1 wherein the width of the wear zone is about 30 microns.

5. A magnetic tape recorder system, comprising:

a magnetic recording tape;

a tape drive for moving the magnetic recording tape linearly and bi-directionally;

a magnetic head for magnetically recording data on the magnetic recording tape and for sensing magnetically recorded data on the magnetic recording tape, the magnetic head comprising:

a rowbar substrate having a transducing surface and a gap surface at a substrate edge;

a transducer row having at least one thin film transducer on the gap surface of the rowbar substrate, the transducer row forming a portion of the transducing surface;

a closure covering the transducer row on a side thereof opposite the gap surface of the rowbar substrate, the closure forming a portion of the transducing surface;

a trench formed in the transducing surface of the rowbar substrate, the trench having first and second edges parallel to the substrate edge; and a wear zone on the transducer surface of the rowbar substrate, the wear zone defined between the substrate edge and the first edge of the trench, wherein, during a wear-in period, the closure, the gap, and the wear zone acquire a bevel that extends to the first edge of the trench, upon formation of the bevel, a length of the bevel remaining constant as the magnetic recording tape is passed over the head resulting in a constant rate of wear of the head, the resultant constant head wear tuned to chase erosion of the gap resulting in reduced recession of the transducer row from the recording tape;

an actuator for positioning the magnetic head to access various tracks on the magnetic recording tape; and a read/write channel coupled electrically to the magnetic head for magnetically recording data on the magnetic recording tape and for reading data recorded on the magnetic recording tape.

6. The magnetic tape recorder system as recited in claim 5 wherein the trench has a length that extends the length of the transducer row.

7. The magnetic tape recorder system as recited in claim 5 wherein the trench has a depth in the range of 0.1-2.0 microns.

8. The magnetic tape recorder system as recited in claim 5 wherein the width of the wear zone is about 30 microns.

9. The magnetic tape recorder system as recited in claim 5 wherein the trench has a width between the first and second edges of about 70 microns.

* * * * *